United States Patent
Cornell et al.

(10) Patent No.: US 6,925,459 B2
(45) Date of Patent: Aug. 2, 2005

(54) APPARATUS AND METHOD FOR HINDERING MULTIPLE HTTP SUBMISSION REQUESTS

(75) Inventors: Jeffrey James Cornell, Rochester, MN (US); Thomas John Eggebraaten, Rochester, MN (US); Sue Sandra Kelling, Rochester, MN (US); Douglas Robert Tollefson, Cannon Falls, MN (US)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 09/749,108

(22) Filed: Dec. 27, 2000

(65) Prior Publication Data

US 2002/0083051 A1 Jun. 27, 2002

(51) Int. Cl.[7] .......................... G06F 17/30; G06F 7/00; G06F 17/00
(52) U.S. Cl. ........................................... 707/3; 707/102
(58) Field of Search ..................................... 707/3, 102

(56) References Cited

U.S. PATENT DOCUMENTS

| 5,796,952 | A | * | 8/1998 | Davis et al. | ........... 395/200.54 |
| 6,128,651 | A | * | 10/2000 | Cezar | ........................ 709/217 |
| 6,317,780 | B1 | * | 11/2001 | Cohn et al. | ................. 709/217 |
| 6,473,738 | B1 | * | 10/2002 | Garrett | ....................... 705/26 |

* cited by examiner

Primary Examiner—Frantz Coby
Assistant Examiner—Cindy Nguyen
(74) Attorney, Agent, or Firm—Martin & Associates

(57) ABSTRACT

An apparatus and method inhibit multiple submission requests by placing an intermediate web page between the page where the user submits information and the following page. After a preset period of time viewing the intermediate page, the user is redirected automatically to the following page. If a user then presses "Reload" or "Refresh" on their browser, the submission of information is not duplicated, thereby hindering multiple submission requests.

6 Claims, 6 Drawing Sheets

```
<%--
 JSPName: RequestSubmit
 Expects: Nothing
 Description: An intermediate page to send the user before taking them to the
              home page
--%>

<%
 response.setHeader("Pragma","No-Cache");
 response.setDateHeader ("Expires",0)
 response.setHEader ("Cache-Control","no-Cache");
%>

<HTML>
 <HEAD>
  <title>Request has been submitted</title>
  <script language="JavaScript">
   function Redirect() {
    document.homebutton.value = 'Home';
    document.submit();
   }
   function RedirectWithDelay() {
    window.setTimeout("Redirect();",5000);
   }
  </script>
 </head>

<body BGCOLOR="lightblue" background="/images/blueback.gif" text=yellow
onload="RedirectWithDelay(); return false;>
      <CENTER>
      <BR><BR>
           <H2> Your Request has been submitted </h2>
           You will be re-directed tot he home page in 5 seconds.<br>
           Or you can press the button below.
                <BR><BR>
                <FORM METHOD="POST" ACTION="Servlet" NAME="sample">
                     <INPUT TYPE="HIDDEN" NAME="homebutton"
                                          VALUE=" ">
                </FORM>
                <A HREF=" " onClick="document.homebutton.value = 'Home';
document.submit(); return false>
      </CENTER>
 </body>
</HTML>
```

FIG. 7

APPARATUS AND METHOD FOR HINDERING MULTIPLE HTTP SUBMISSION REQUESTS

BACKGROUND OF THE INVENTION

1. Technical Field

This invention generally relates to web pages and more specifically relates to an apparatus and method for hindering multiple requests that may be inadvertently made by a user.

2. Background Art

Since the dawn of the computer age, computer systems have evolved into extremely sophisticated devices, and computer systems may be found in many different settings. The widespread proliferation of computers prompted the development of computer networks that allow computers to communicate with each other. With the introduction of the personal computer (PC), computing became accessible to large numbers of people. Networks for personal computers were developed that allow individual users to communicate with each other.

One significant computer network that has recently become very popular is the Internet. The Internet grew out of this proliferation of computers and networks, and has evolved into a sophisticated worldwide network of computer system resources commonly known as the "world-wide-web", or WWW. A user at an individual PC (i.e., workstation) that wishes to access the Internet typically does so using a software application known as a web browser. A web browser makes a connection via the Internet to other computers known as web servers, and receives information from the web servers that is rendered to the user's workstation. Information transmitted from the web server to the web browser is generally formatted using a specialized language called Hypertext Markup Language (HTML) and is typically organized into pages known as web pages.

Online merchants have discovered the value of selling their goods via the Internet. Many allow users to place goods in a virtual "shopping cart", then when the user is prepared to finalize the purchase, they proceed to the "checkout." At this stage, all of the items in the user's shopping cart are displayed with their prices, tax, shipping and handling, and a total amount due is shown to the user. The user can then enter credit card information, and pressing a "submit" button sends the credit card information to the merchant, which then authenticates the credit card and receives an authorization for the sale. One potential problem that exists is that, if precautions are not taken, a user's order may be inadvertently submitted twice. For example, if the user clicks the submit button, then reloads the page, the information in the form will be re-submitted, causing the order to be entered twice. Of course, an online merchant could monitor for duplicate orders within a short time period, and could simply invalidate the second (duplicate) order. However, if the user continues browsing for some time, and then presses the "Back" button on the browser repeatedly until the order page is reloaded, the time span between orders could be sufficient to fool the online merchant into thinking that the second order is a new order, causing double the order (and hence, double the expense to the user). This results in great inconvenience to the user, who has to return the unwanted goods and go through the hassle of getting money refunded for the duplicate order. Without a mechanism and method for easily and effectively hindering multiple submission requests, online merchants will be plagued with the problem of inadvertent duplicate orders, or will be forced to use sophisticated methods for inhibiting multiple submission requests.

DISCLOSURE OF INVENTION

According to the preferred embodiments, an apparatus and method inhibit multiple submission requests by placing an intermediate web page between the page where the user submits information and the following page. After a preset period of time viewing the intermediate page, the user is redirected automatically to the following page. If a user then presses "Reload" or "Refresh" on their browser, the submission of information is not duplicated, thereby hindering multiple submission requests.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 7 is a source code listing for the intermediate page 227 of FIG. 5 implemented as a Java server page (.jsp).

BEST MODE FOR CARRYING OUT THE INVENTION

Overview

The method and apparatus of the present invention has particular applicability to surfing the Internet. For those individuals who are not familiar with the Internet, a brief overview of relevant Internet concepts is presented here.

Figure 1:
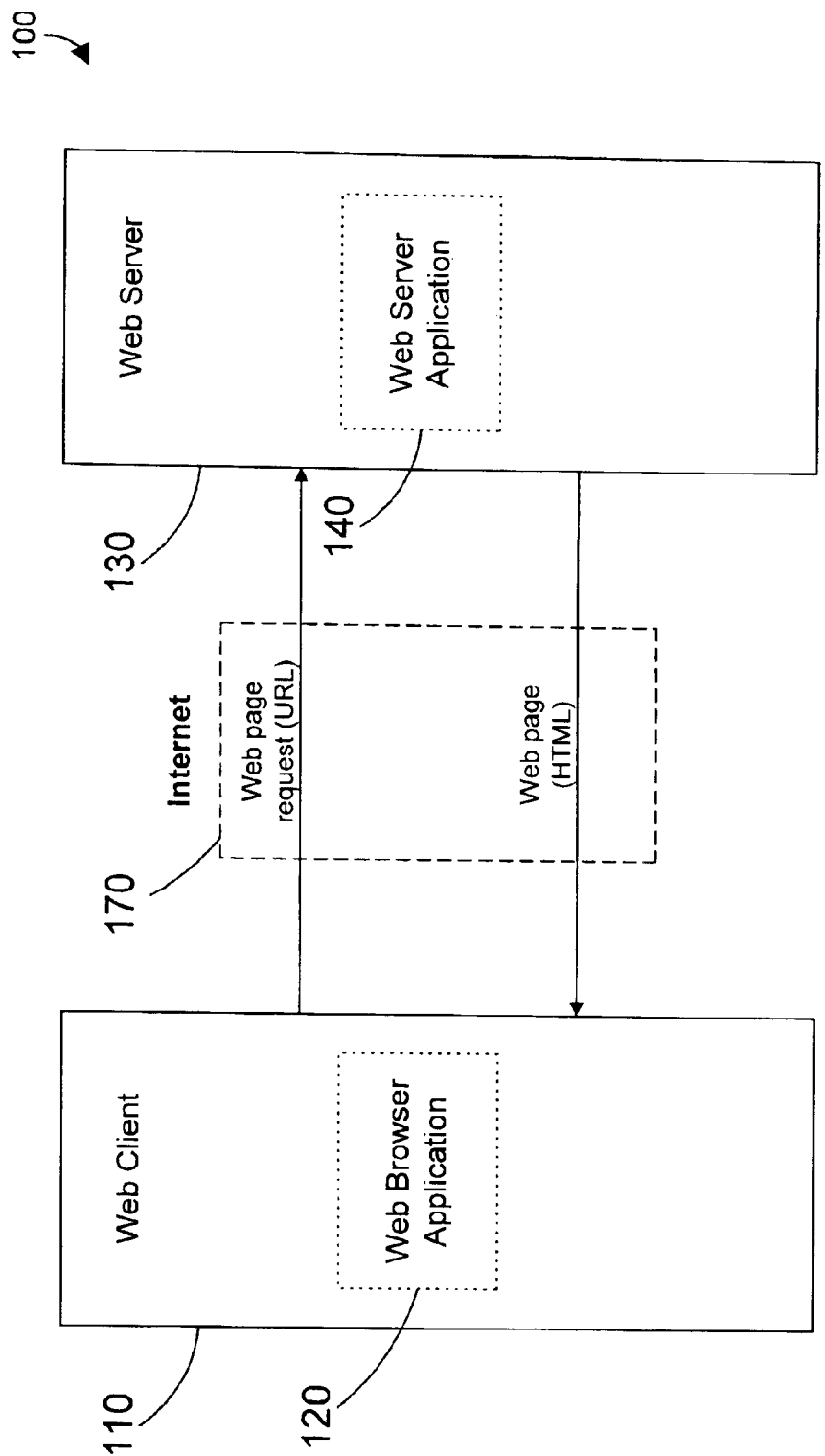
FIG. 1 is a block diagram of a prior art configuration for a web client to receive information from a web server.

An example of a typical Internet connection is shown by the apparatus 100 in FIG. 1. A user that wishes to access information on the Internet 170 typically has a computer workstation 110 (referred to as a "web client") that executes an application program known as a web browser 120. Under the control of web browser 120, web client workstation 110 sends a request for a web page over the Internet 170. Each web server on the Internet has a known address, termed the Uniform Resource Locator (URL), which the web browser uses to connect to the appropriate web server. Because web server 130 can contain more than one web page, the user will also specify in the address which particular web page he or she wants to view on web server 130. A web server computer system 130 executes a web server application 140, monitors requests, and services requests for which it has responsibility. When a request specifies web server 130, web server application 140 generally accesses a web page corresponding to the specific request, and transmits the web page to the web browser 120 on the user's workstation 110. Known web browsers include Netscape Communicator and Microsoft Internet Explorer.

A web page may contain various types of data, including text, graphics and other forms of information, collectively known as MIME data. Most web pages include visual data that is intended to be displayed on the monitor of user workstation 110. Web pages are generally written in Hypertext Markup Language (HTML) or as Java server pages (.jsp files). When web server 130 receives a web page request, it will send the requested web page across the Internet 170 to the requesting web browser 120. Web browser 120 understands HTML and Java and interprets the web page and outputs the web page to the monitor (or display) of user workstation 110. This web page displayed on the user's screen may contain any suitable MIME data, including text, graphics, audio elements, video elements, and links (which reference addresses of other web pages). The user can invoke other web pages by clicking on these links using a mouse or other pointing device. This entire system of web pages with links to other web pages on other servers across the world is known as the "World Wide Web".

The remainder of this specification describes how the preferred embodiments inhibit the inadvertent multiple submission of information in a very simple manner as a user surfs the Internet.

DETAILED DESCRIPTION

Figure 2:
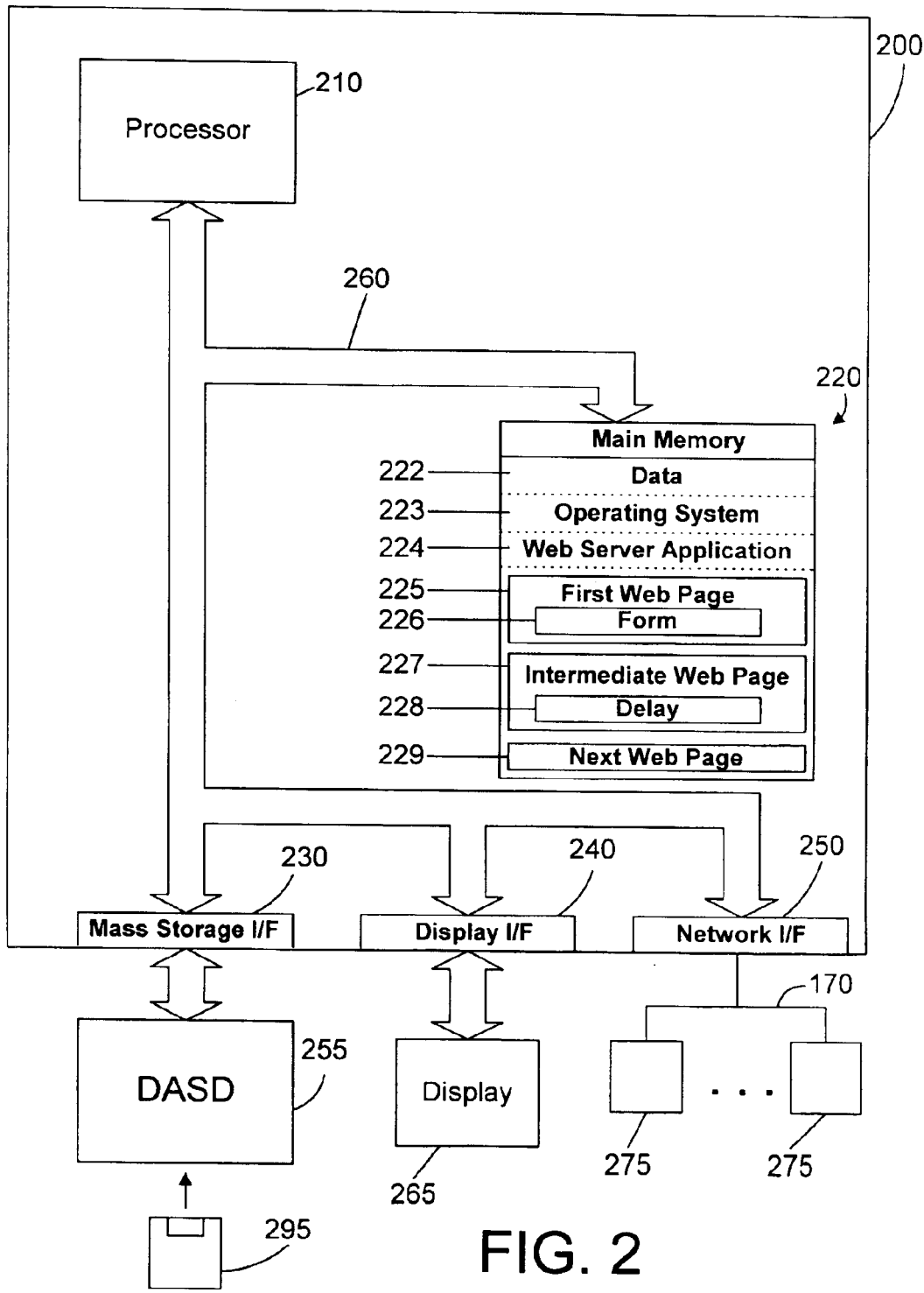
FIG. 2 is a block diagram of an apparatus in accordance with the preferred embodiments.

Referring to FIG. 2, one specific implementation of an apparatus in accordance with the preferred embodiments is an IBM iSeries 400 computer system 200. Computer system 200 comprises a processor 210 connected to a main memory 220, a mass storage interface 230, a display interface 240, and a network interface 250. These system components are interconnected through the use of a system bus 260. Mass storage interface 230 is used to connect mass storage devices (such as a direct access storage device 255) to computer system 200. One specific type of direct access storage device is a floppy disk drive, which may store data to and read data from a floppy diskette 295.

Main memory 220 in accordance with the preferred embodiments contains data 222, an operating system 223, a web server application 224, a first web page 225, an intermediate web page 227, and a next web page 229. First web page 225 includes a form 226 for a user to submit data to the web server application 224. Intermediate web page 227 specifies a delay 228 before automatically rendering the next web page 229. Computer system 200 utilizes well known virtual addressing mechanisms that allow the programs of computer system 200 to behave as if they only have access to a large, single storage entity instead of access to multiple, smaller storage entities such as main memory 220 and DASD device 255. Therefore, while data 222, operating system 223, web server application 224, first web page 225, intermediate web page 227, and next web page 229 are shown to reside in main memory 220, those skilled in the art will recognize that these items are not necessarily all completely contained in main memory 220 at the same time. It should also be noted that the term "memory" is used herein to generically refer to the entire virtual memory of computer system 200.

Data 222 represents any data that serves as input to or output from any program in computer system 200. Operating system 223 is a multitasking operating system known in the industry as OS/400; however, those skilled in the art will appreciate that the spirit and scope of the present invention is not limited to any one operating system. Web server application 224 is a computer program that services requests for web pages from web browsers and renders web pages to the web browsers that request them, similar in many ways to web server application 140 in FIG. 1. A web server application 224 generally has responsibility for serving many web pages. While only three web pages are shown in FIG. 2, one skilled in the art will recognize that many other web pages may reside in main memory 220 or in DASD 255 as well.

First web page 225 includes a form 226 into which a user may enter information and then submit the form to the web server application 224. The form 226 simply denotes the ability for a user to submit information to a web server application, and is not intended to be limiting to any actual type or configuration of form. First web page 225 expressly extends to any type of web page that allows the user to input user-specific information to web server application 224.

Intermediate web page 227 includes a specified delay 228 that determines the length of time that the intermediate web page 227 is rendered before rendering the next web page 229. Once the user submits the information in form 226 of first web page 225, the web server application renders the intermediate web page 227 for the amount of time specified in the delay 228. Once the delay has passed, the web server application 224 automatically displays the next web page 229.

Note that the terms "first web page", "intermediate web page" and "next web page" are used herein as labels to distinguish between these three different web pages. These labels should not be construed as limiting the type or order of these web pages. For example, the "first web page" is not necessarily rendered first by the web server application 224. The home page for a company may actually be the "next web page" 229. The user could then navigate through the web site to purchase goods, and when the user is ready to submit his or her credit card information to complete the sale, the first web page 225 would then be rendered. Once the user enters the requested information and submits the form 226 to the web server application 224, the web server application 224 then renders the intermediate web page 227 for the amount of time specified by the delay 228, then renders the next web page 229 (i.e., returns the user to the home page for this specific example).

The purchase of goods online is used herein as an example of one type of activity that requires a user to enter information into a form for submission to a web server. There are many other types of activities besides purchases that may require submitting information to a web server. For example, a user may be registered with a web site, and may need to change his or her address if the user moves, or may need to change his or her name if the user marries. The preferred embodiments expressly extend to any and all information that a user may need to submit to a web server, whether now envisioned or whether the need arises in the future.

Processor 210 may be constructed from one or more microprocessors and/or integrated circuits. Processor 210 executes program instructions stored in main memory 220. Main memory 220 stores programs and data that processor 210 may access. When computer system 200 starts up, processor 210 initially executes the program instructions that make up operating system 223. Operating system 223 is a sophisticated program that manages the resources of computer system 200. Some of these resources are processor 210, main memory 220, mass storage interface 230, display interface 240, network interface 250, and system bus 260.

Although computer system 200 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 210. However, those skilled in the art will appreciate that the present invention applies equally to computer systems that simply use I/O adapters to perform similar functions.

Display interface 240 is used to directly connect one or more displays 265 to computer system 200. Display 265 may be simple display devices or fully programmable workstations, and are used to allow system administrators to communicate with computer system 200.

Network interface 250 allows computer system 200 to send and receive data to and from any network the computer system may be connected to. This network may be a local area network (LAN), a wide area network (WAN), or more specifically the Internet 170. Suitable methods of connecting to the Internet include known analog and/or digital techniques, as well as networking mechanisms that are developed in the future. Many different network protocols can be used to implement a network. These protocols are specialized computer programs that allow computers to communicate across a network. TCP/IP (Transmission Control Protocol/Internet Protocol), used to communicate across the Internet, is an example of a suitable network protocol.

Figure 3:
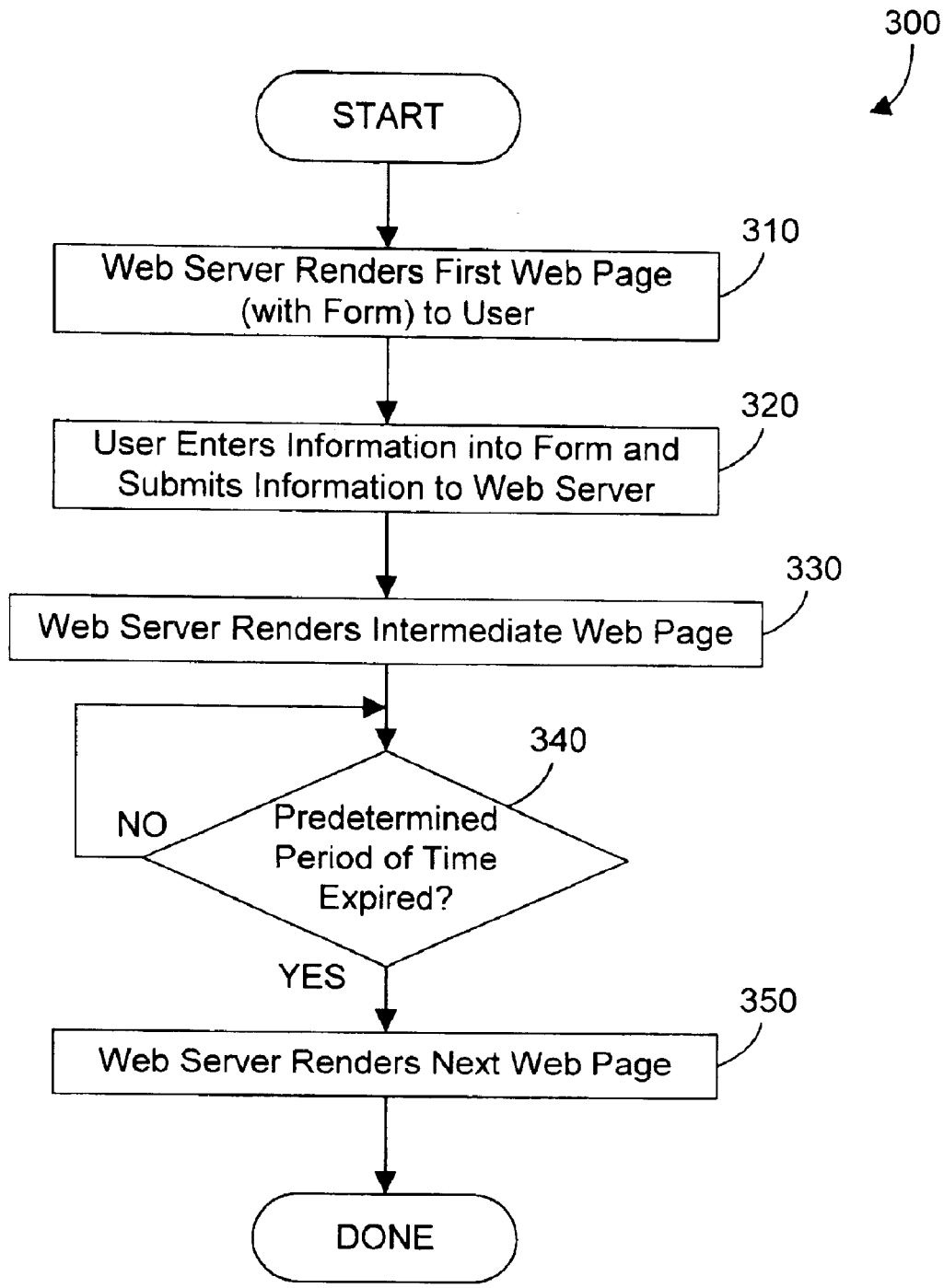
FIG. 3 is a flow diagram of a method for rendering web pages in accordance with the preferred embodiments.

Referring now to FIG. 3, a method 300 in accordance with the preferred embodiments begins by the web server rendering the first web page 225 with its form 226 to the user (step 310). The user enters information into the form and submits the information to the web server (step 320). This step is generally done by the user typing in information; selecting among information displayed on radio buttons, check boxes, and drop-down lists; and any combination of these. Note that the preferred embodiments expressly extend to rendering multiple pages with multiple forms for gathering needed information from the user. All of these pages together constitute a "first web page" 225 for the purpose of this disclosure, and their respective forms are all part of the form 226. Regardless of the configuration of the first web page 225 and its associated form 226, there comes a point when the user must confirm that the information was entered correctly and submit the information to the web server. This submission of the form information is performed in step 320 of FIG. 3.

Once the web server sees that the form has been submitted, it processes the form data such as saving it to a database, then the web server renders the intermediate page 227 (step 330). The web server then monitors a timer, and waits (step 340=NO) until the delay 228 specified in the intermediate web page has expired (step 340=YES). Once the delay has expired, the web server renders the next web page (step 350). By rendering an intermediate web page and then dynamically redirecting to a different web page, if a user clicks the "Reload" or "Refresh" button on their browser with the next page displayed, the information in the form on the first web page is not re-submitted to the web server. Also, if a user clicks the "Back" button on their browser with the next page displayed, the browser returns to the intermediate page instead of the first page, thus preventing the user from accidentally submitting the form a second time. In this manner the intermediate web page with dynamic redirection inhibits the resubmission of duplicate HTTP requests to a web server.

Figure 4:
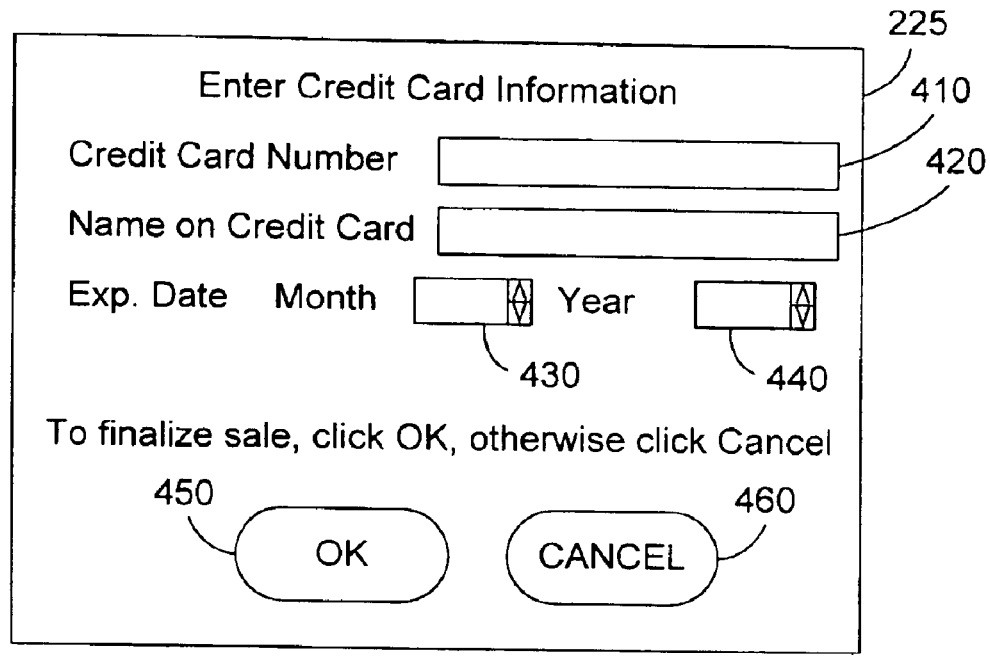
FIG. 4 is a diagram of a sample first web page 225 shown in FIG. 2.

A specific example is now presented in FIGS. 4–7 to illustrate the concepts of the preferred embodiments disclosed herein. We assume that a user has navigated the web site of an online merchant known as Joyce's Jungle Juice, and has decided to purchase some goods. We assume that the user has already verified the items to be purchased, their cost, the shipping and handling costs, etc., and is now ready to pay for the order. Referring to FIG. 4, a web page requesting credit card information is one suitable first web page 225. The form 226 includes the field for the credit card number 410; the field for the name on the credit card 420; and the expiration month 430 and year 440. Once appropriate information has been entered into these fields 410, 420, 430 and 440 by the user, the user clicks on the OK button 450. Of course, if the user changes his or her mind, the user may click on the cancel button 460 to terminate the sale.

We assume for this example that the user enters valid information into fields 410, 420, 430 and 440 of first web page 225, then clicks on the OK button 450. The information in the form (from fields 410, 420, 430 and 440) is submitted to the web server. The web server then renders the intermediate page 227 shown in FIG. 5, which states that the user's request has been submitted. The user then has the option of waiting until the predetermined delay 228 expires, at which time the web server renders the next web page 229 shown in FIG. 6 (which happens to be the home page for Joyce's Jungle Juice). In the alternative, the user can click on the button 510 to proceed immediately to the next web page 229.

Figure 5:
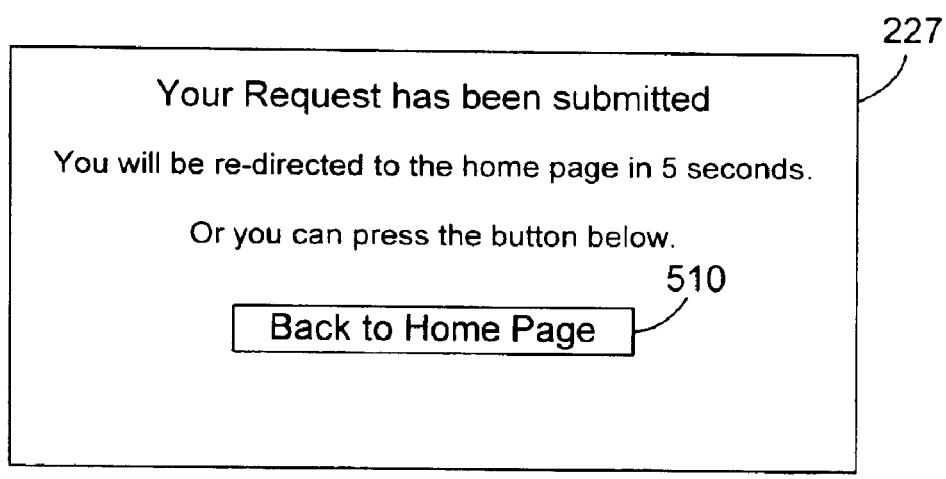
FIG. 5 is a diagram of a sample intermediate web page 227 shown in FIG. 2.
Figure 6:
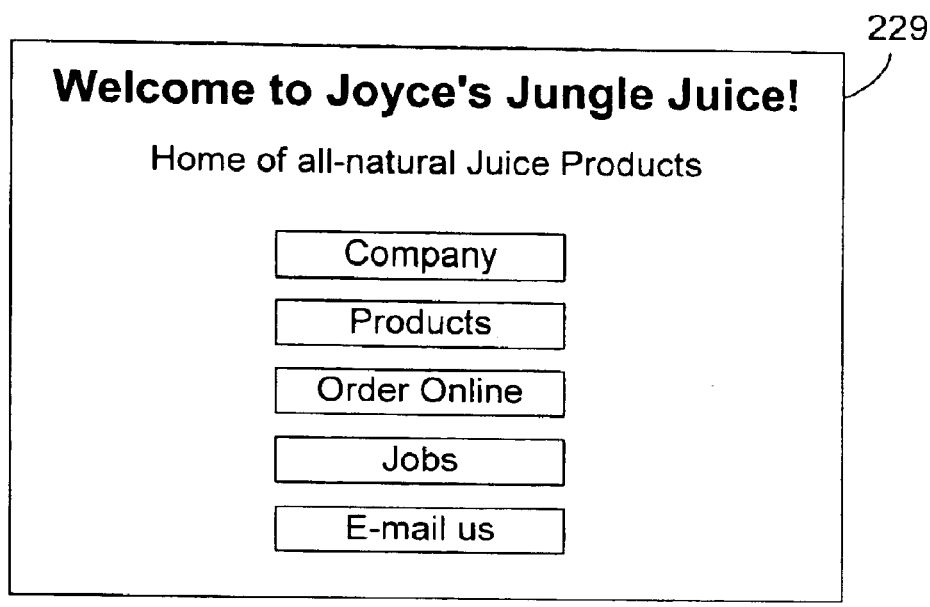
FIG. 6 is a diagram of a sample next web page 229 shown in FIG. 2.

The source code for a Java server page (.jsp) that is the intermediate page 227 of FIG. 5 is shown in FIG. 7. Of course, this page could also be programmed in different forms, such as a static HTML page rather than a Java server page. The specific example of FIG. 7 is shown as the best mode of the invention that was implemented as a Java server page. The delay is set to five seconds, which provides the user sufficient time to read the page before the next page 229 is rendered.

The preferred embodiments provide a very simple mechanism for a web server to inhibit multiple HTTP submission requests by interposing an intermediate web page for a limited period of time, then automatically redirecting to a different page. Using the present invention, if a user clicks on the "Reload" or "Refresh" buttons in their web browser when displaying the next page, the information in the form on the first web page will not be resubmitted to the web server.

The concept of redirection is known in the art, and is commonly used for directing an HTTP request for a web page to the location of a different web page if the requested web page is no longer available. Redirection with a delay as discussed herein is also known. However, redirection as a result of submitting a form to a web server is not known in the art, and is the subject of the present invention. By redirecting the user to an intermediate page, then to a next page after a short delay, the likelihood of inadvertently submitting the form information to the web server multiple times decreases.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:
   at least one processor;
   a memory coupled to the at least one processor;
   a web server application residing in the memory and executed by the at least one processor, the web server application rendering specified web pages to web browsers at the web browsers' request;

a first web page residing in the memory that includes a form into which a user may enter information and a mechanism for the user to submit the entered information to the web server application;

an intermediate web page residing in the memory;

a next web page residing in the memory;

wherein the web server application renders the first web page to a browser for the user to enter the information, and when the user submits the entered information to the web server application, the web server application receives the entered information, renders the intermediate page for a predetermined period of time, and then automatically renders the next web page when the predetermined period of time expires.

2. The apparatus of claim 1 wherein if the user reloads the next web page the entered information is not re-submitted to the web server application.

3. The apparatus of claim 1 wherein the intermediate web page specifies the predetermined period of time.

4. A method for a web server to render web pages to a user, the method comprising the steps of:

(A) rendering to a user a first web page that includes a form into which the user may enter information and a mechanism for the user to submit the entered information to the web server;

(B) when the user submits the entered information to the web server, the web server performs the steps of:

(B1) receiving the entered information;

(B2) rendering an intermediate web page for a predetermined period of time; and (B3) automatically rendering a next web page when the predetermined period of time expires.

5. The method of claim 4 further comprising the step of not resubmitting the entered information when the user clicks on a reload or refresh button in a web browser that is displaying the next web page.

6. The method of claim 4 wherein the intermediate web page specifies the predetermined period of time.

* * * * *